Feb. 13, 1968   A. L. DRUMBORE   3,368,594
MITER GUIDE FOR PORTABLE POWER SAWS
Filed April 18, 1966   3 Sheets-Sheet 1
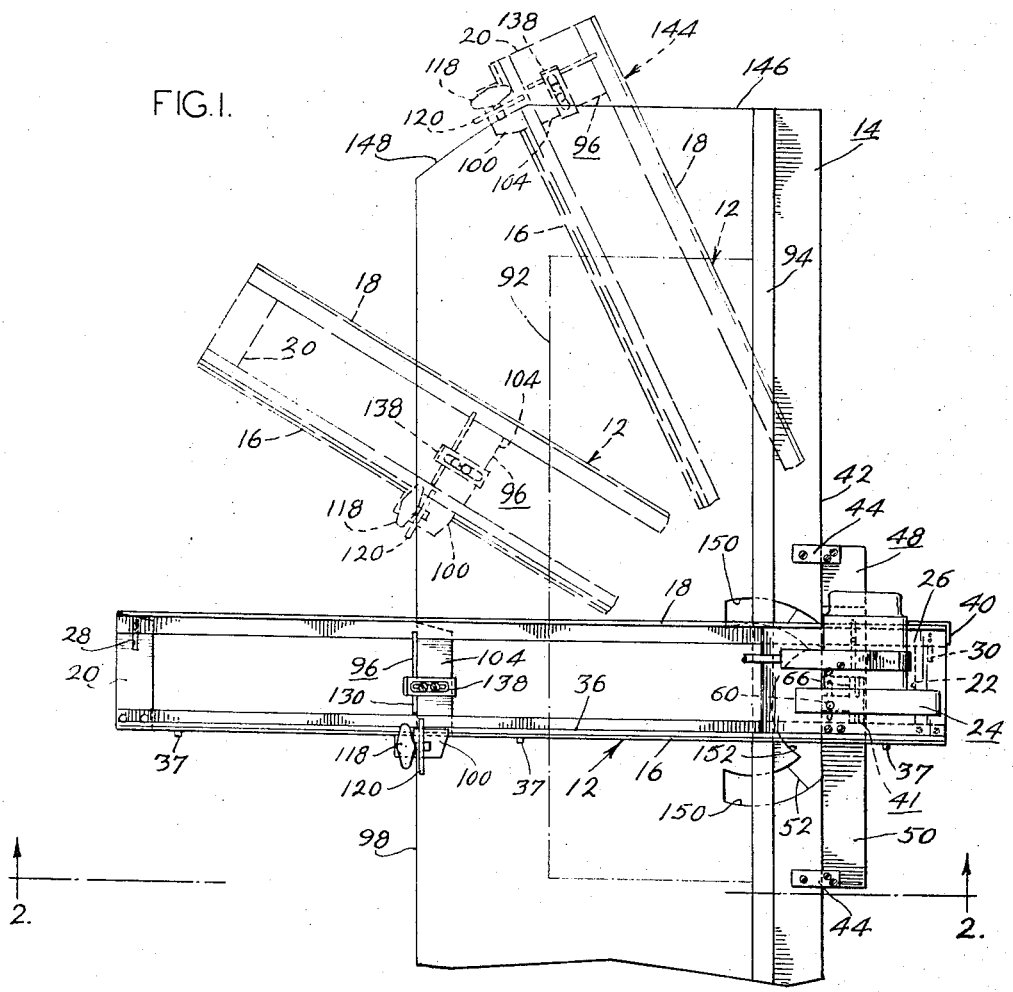
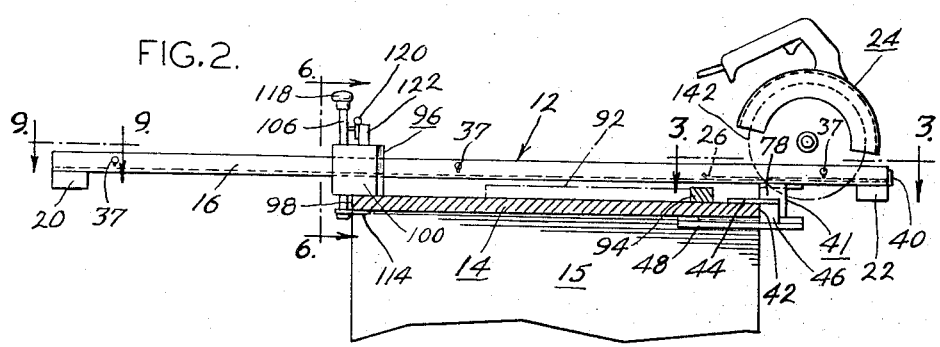
INVENTOR:
ALLEN L. DRUMBORE
BY Howson & Howson
ATTYS.

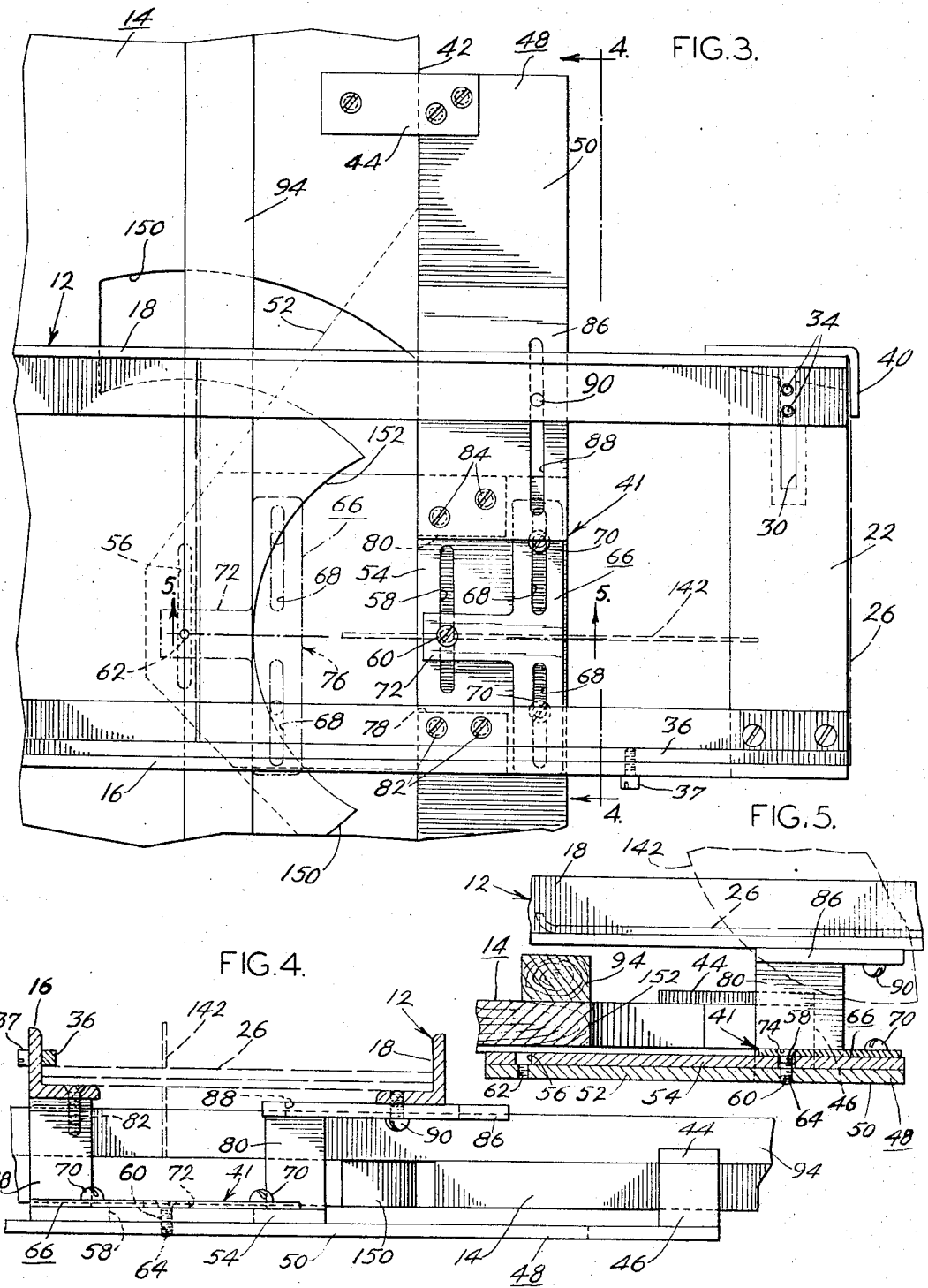

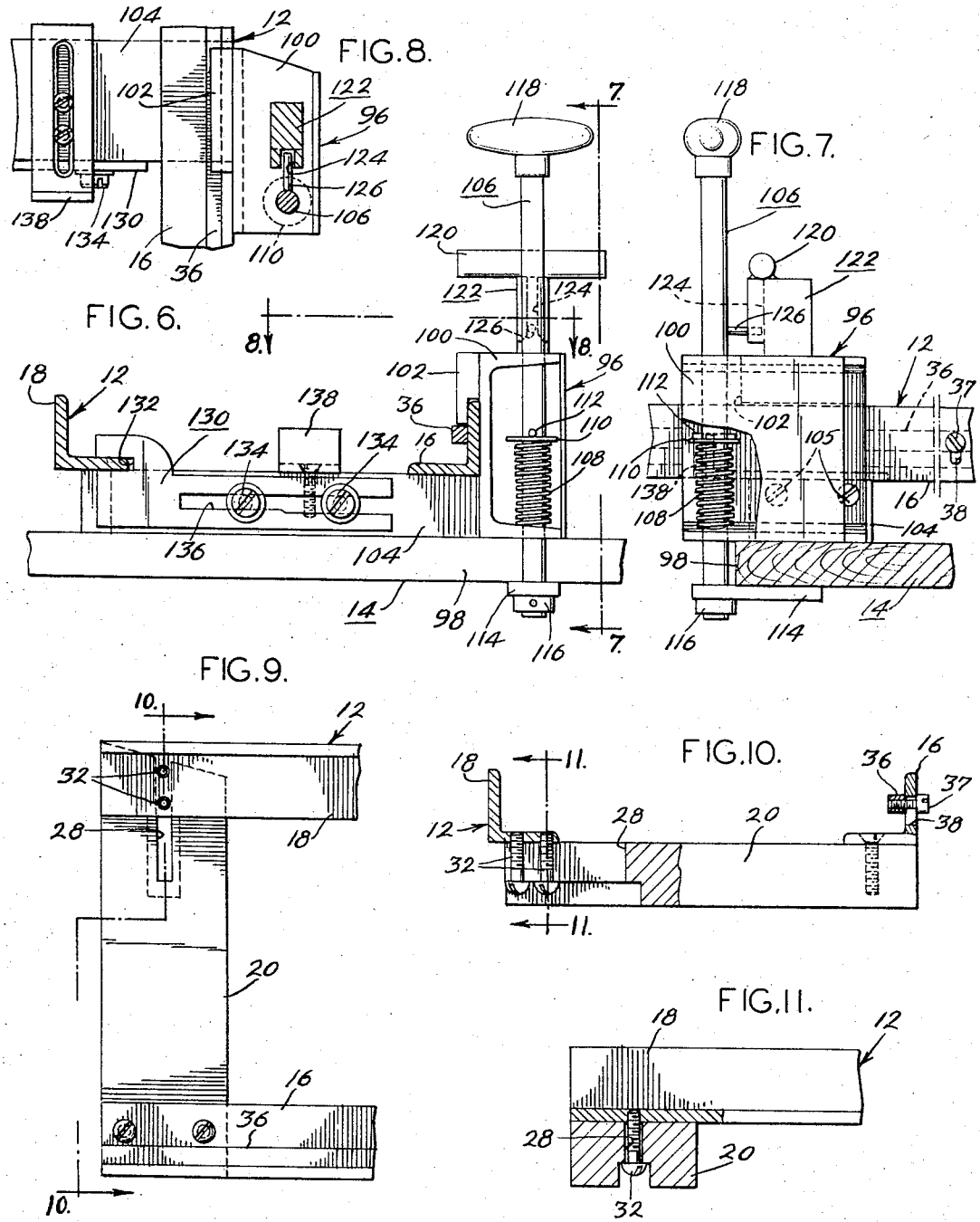

United States Patent Office …

3,368,594
Patented Feb. 13, 1968

3,368,594
MITER GUIDE FOR PORTABLE POWER SAWS
Allen L. Drumbore, Old Bethlehem Road, M.R. 1,
Perkasie, Pa. 18944
Filed Apr. 18, 1966, Ser. No. 543,330
11 Claims. (Cl. 143—6)

The present invention relates generally to guide arrangements for facilitating the cutting of miter joints with a portable power saw.

Portable power saws of the circular saw type, commonly known as builders saws, are in widespread use in the construction industry and have to a large extent supplanted the large amount of hand sawing formerly required in the building trades. Such saws are particularly well suited for the numerous cross cuts necessary in the rough framing of buildings and for such work may be readily hand-guided to produce satisfactory cuts. However, for finish work such as interior and exterior trim and especially for miter joints which must be accurately executed, the portable power saw has proven difficult to control without some type of auxiliary guide. The difficulty stems mainly from the problem of aligning the rotating saw blade, which is practically concealed by a cumbersome casing and guard, with the desired cut line. In addition, the vibration and high cutting speed of the saw and the line-obscuring sawdust generated during a cut, impede accurate work. Since it usually cannot be determined until well after a cut is started whether the saw is, in fact, properly aligned with the desired cut line, false starts are common in hand-guided saw operation and a considerable wastage of material and time results.

Because of the above difficulties incident to hand-guided saw operation, guide arangements of various types have been devised for portable power saws to permit a correct initial alignment of the saw and to maintain the alignment during the cutting operation. The miter guides previously developed generally include, as does the present invention, a horizontal track for guiding the saw over the stock to be cut, the track normally being pivotally mounted above a work-supporting table to permit adjustment to the desired cutting angle. Such guides have the further advantages of permitting multiple cuts at the same cutting angles with a substantial saving of time and an improved accuracy over former cutting methods.

A serious shortcoming of previous devices has been the cumbersome manipulation necessary to reset the saw cutting angle. Since, on a typical building project, the cutting angle is subject to frequent change, especially when a number of men are using the same guide unit, it is important that adjustment of the cutting angle be quickly and easily effected.

A further disadvantage of prior guides has been the pivoting of the adjustable track assembly at a point well beyond the work guide with the result that the work guide, after a period of saw use at various angles, is destroyed in the critical region adjacent the saw cut. The destruction of the guide prevents the proper support of the work adjacent the cut and splintering and breaking away of the work in this region can be expected. With extremely small stock, such as interior trim, the absence of the work guide in this region can result in substantial deflections of the stock and make impossible any accurate angled cuts.

In addition, previous guide arrangements, although usually adjustable for saws having various width base plates, have no provision for centering the saw cut over the pivot point of the track assembly. When different saws are used on the same unit, the work guide is rapidly eaten away by passage of the several saws through the guide at a variety of points.

In view of the above shortcomings of previously developed saw guides, it can be understood to be a primary advantage of the present invention to provide a meter guide for portable power saws adapted for use with different sized saws which may be quickly and easily adjusted to the desired cutting angle.

A further object of the invention is to provide a miter guide as described having a novel cutting angle adjustment arrangement adapted for one hand operation.

An additional object of the invention is to provide a miter guide as described, the pivot point of which may be adjusted to prevent undue damage to the work guide.

A still further object of the invention is to provide a miter guide as described, the pivot point of which is adjustable to coincide with the cutting line of the saw employed therewith.

Additional objects and advantages of the invention will be more readily apparent from the following description of an embodiment thereof when taken together with the accompanying drawings in which:

FIG. 1 is a plan view of a miter guide embodying the present invention showing in broken lines the manner in which the guide may be positioned for various cutting angles.

FIG. 2 is an elevational view taken along line 2—2 of FIG. 1;

FIG. 3 is a partial plan view taken along line 3—3 of FIG. 2 showing details of the track pivot assembly;

FIG. 4 is a view partly in section taken along line 4—4 of FIG. 3;

FIG. 5 is a sectional view taken along line 5—5 of FIG. 3;

FIG. 6 is a view taken along line 6—6 of FIG. 2 and showing details of the track positioning assembly;

FIG. 7 is a view taken along line 7—7 of FIG. 8 which is partly broken away to show details of the track positioning assembly;

FIG. 8 is a plan view taken along line 8—8 of FIG. 6;

FIG. 9 is a view taken along line 9—9 of FIG. 2 showing details of the adjustable track assembly;

FIG. 10 is a view partly in section taken along line 10—10 of FIG. 9; and

FIG. 11 is a view partly in section taken along line 11—11 of FIG. 10.

Referring to the drawings, a miter guide generally designated 12 embodying the present invention is shown mounted on a horizontal table 14 having suitable support means 15. The table 14 may for example comprise a sheet of one inch plywood and should be sufficiently rigid to withstand the weight of the guide and saw without bending. Since the present miter guide may be quickly and easily attached to any table, for building construction work the table can most conveniently be fabricated at the site from available materials and would be discarded at the completion of the project.

The miter guide 12 comprises a pair of spaced parallel angles 16 and 18 which are attached to spacing elements 20 and 22 at the respective ends thereof to form a track assembly along which a portable power saw 24 may be slidably guided. The rectangular base plate 26 of the saw 24 is supported by the horizontal legs of the track angles, and vertical legs of the angles serving as guides to maintain an aligned course of the saw. As shown for example in FIGS. 9, 10 and 11, the spacing of the angles may be adjusted by means of the respective slots 28 and 30 in the spacing elements 20 and 22 within which the respective screws 32 and 34 may be adjustably positioned to move the angle 18 with respect to the spacing elements and the angle 16. As shown for example in FIG. 10, a retaining rail 36 is adjustably mounted in parallel spaced relation to the horizontal leg of the angle 16 by means of the screws 37 passing through the vertical slots 38 in the angle. The rail 36 is adjusted to provide a sliding clearance for the base plate 26 of the saw and serves to prevent inadvertent vertical movement of the saw during saw operation. A stop 40 is attached to the angle 18 adjacent the spacing element 22 to prevent saw travel beyond the end of the track.

The track assembly comprising the angles 16 and 18 and the spacing elements 20 and 22 is pivotally supported in spaced relation to the table top by a pivot assembly 41 shown most clearly in FIGS. 3–5. Suspended below the back edge 42 of the table 14 by means of the brackets 44 and spacing blocks 46 is the pivot support plate 48 which is mounted at approximately the center of the back edge 42 of the table. The pivot support plate 48, which is the base of the pivot assembly, as shown in FIG. 3 includes an elongated rectangular portion 50 extending outwardly from the table edge 42 and a portion 52 in the shape of a truncated triangle extending inwardly beneath the table. Pivotally supported on the pivot support plate 48 is the pivot plate 54, shown most clearly in FIGS. 3 and 5, having inner and outer pivot slots 56 and 58. A pivot screw 60 may be passed through either of the pivot slots 56 and 58 and seated in the inner or outer threaded pivot holes 62 or 64 in the pivot support plate as shown in FIG. 5. In the drawings, the pivot screw is shown in the outer pivot slot and outer pivot hole.

A T-shaped pivot adjustment plate 66 is adjustably attached to the pivot plate 54 by means of the slots 68 therein through which pass the adjustment screws 70. Arm 72 of the T plate 66 in the position of the T plate shown in FIG. 3 extends over the outer pivot slot 58 in the pivot plate and as indicated is bored and countersunk at 74 to receive and position the pivot screw 60 in the slot 58. It is apparent that by adjustment of the screws 70 in the slots 68, the T plate may be laterally adjusted to move the pivot screw location with respect to the pivot plate 54. As shown in broken lines in FIG. 3 at 76, the T plate 66 may alternately be mounted on the portion 52 of the pivot support plate to position the pivot screw in the inner slot 56 to provide an alternate pivot point for the unit, the pivot hole 62 being used with such a T plate placement.

Track assembly support blocks 78 and 80 are secured in spaced relation on the pivot plate 54 on opposite sides thereof as shown in FIG. 4. The track angle 16 is secured directly to the support block 78 by screws 82. Attached to the support block 80 by the screws 84 is a support plate 86 extending perpendicular to the track angles and having an adjustment slot 88 therein through which a screw 90 is passed from beneath the plate to secure the angle 18 thereto. The screw 90 must be loosened when the spacing between the angles 16 and 18 is adjusted to adapt the guide to a particular power saw.

From the foregoing it can be understood that the track assembly, being attached by means of the support blocks 78 and 80 to the pivot plate 54, is adapted to rotate in a horizontal plane about the pivot screw 60 which may be placed in either of the pivot holes 62 and 64. The slotted T plate 66 permits the alignment of the power saw blade with the pivot point of the pivot assembly as illustrated in FIG. 4.

As shown most clearly in FIG. 2, the track assembly is raised above the surface of the table 14 a distance sufficient to clear the work to be sawed, a piece of siding being shown at 92 in broken lines to illustrate the work position on the table. A wooden guide strip 94 extending the full length of the table and spaced parallel to the rear edge 42 thereof is secured to the table surface to provide an aligning means against which the work is securely held. With the work positioned against the guide 94, the track assembly is pivoted by means of the pivot assembly to the desired cutting angle as indicated for example by the partial broken line views of FIG. 1.

To provide a ready adjustment of the track angle and to maintain the proper spacing of the front end of the track assembly above the table, a track positioning assembly 96 is slidably attached to the track assembly and is adapted to releasably secure the track assembly to the front edge 98 of the table. The track positioning assembly as shown in detail in FIGS. 6–8 includes a spring housing 100 which is disposed along the outer side face of the angle 16, being slidably engaged therewith by means of the flanged guide element 102 extending over the vertical leg of the angle 16 and further by means of a spacing element 104 attached to the housing by screws 105 which extends beneath the angles 16 and 18. The spacing element 104 and the housing 100 rest on the surface of the table 14, the spacing element serving in conjunction with the pivot assembly to support the track assembly in the desired spacing above the table.

A spring loaded plunger 106 passes vertically through the spring housing 100, being spring loaded in an upward direction by the compression spring 108 in the spring housing which is seated at its lower end on the spring housing and at its upper end on washer 110 bearing against the pin 112 on the plunger. The lower end of the plunger extends beneath the table edge and carries a transverse locking arm 114 secured thereto by the retaining nut 116, the locking arm being spring-biased against the bottom of the table to secure the track assembly in the desired position. A handle 118 on the top of the plunger spaced above the spring housing 100 permits the depression of the plunger to release the locking arm 114 from contact with the table to allow repositioning of the track assembly.

For convenience in manipulating the handle 118 and to permit one handed operation of the assembly, a second handle 120 is fixedly mounted on the support element 122 on the top of the housing 100. A slot 124 in the support element 122 is adapted to receive a pin 126 extending transversely from the plunger 106, the coaction of the pin with the slot insuring the alignment of the locking arm 114 with the track angles. The slot 124 is discontinued short of the top of housing 100 to permit the freeing of the pin from the slot when the plunger is depressed. When this is done, the plunger can be turned to pivot the locking arm 114 away from the table, thus freeing the assembly from the table edge.

In order to maintain contact of the spacing element 104 with the angle 18 when the positioning assembly is moved off the table edge, a retaining plate 130 having a slot 132 therein adapted to engage the horizontal leg of the angle 18 is adjustably mounted on a side face of the spacing element 104 by the screws 134 in the slot 136 of the plate. The slot 136 is widened at its open end as illustrated to permit a tight adjusting of the spacing element 104 against the underside of the angle 18. A stop angle element 138 is mounted on the spacing element 104 to provide a stop for the saw and prevent inadvertent saw travel into the spacing element 104.

For operation of the guide, the spacing of the angles 16 and 18 of the track assembly is first adjusted to accommodate the base plate 26 of the particular saw to be used with the guide. A slight clearance should be permitted to provide a smooth movement of the saw along the track assembly but without play. The rail 36 must also be vertically adjusted to accommodate the base plate of the saw. The pivot assembly should then be properly set up, the selection first being made of the pivot hole to be utilized on the pivot support plate 48. It will be noted that the inner pivot hole 62 falls directly beneath the inner edge of the work guide 94 as shown in FIGS. 1 and 3, and when the inner pivot hole is utilized, the saw blade will intersect the work guide at the same point regardless of the angle at which the saw is set. With the pivot point at the outer pivot hole 64, the saw blade will intersect the work guide at a different point for each angle setting and the saw blade will cut through the work guide at each setting.

When the pivot hole has been selected, the T plate 66 is placed in the proper position on the pivot plate 54 and is adjusted by means of the screws 70 in the slots 68 to laterally position the track assembly so as to align the saw blade with the pivot point. The proper alignment of the saw blade with the pivot point is shown in FIG. 4 wherein the saw blade is schematically illustrated in broken lines at 142.

With the track assembly adjusted in the foregoing manner, the saw blade depth is set so that the blade just touches the table surface, this proper depth being shown by the schematic saw blade in broken lines in FIGS. 4 and 5. The piece of work to be sawed is then placed on the table 14 against the work guide 94 in the position shown at 92 in FIGS. 1 and 2. The angle of the track assembly is then adjusted to provide the desired cutting angle, the assembly being movable upon depressing the plunger 106 to release the locking arm 114 from contact with the bottom surface of the table. When the correct angular position of the track assembly has been reached, the plunger is released and the locking arm 114 reengages the table by the action of the compression spring 108 to clamp the track assembly in the selected position.

The ease and speed with which the track assembly can be angularly positioned is an important advantage of the invention and results from the construction of the positioning assembly which permits one-handed adjustment of the track assembly. By grasping the fixed handle 120 with the fingertips, the plunger handle 118 may be depressed by the palm of the hand to permit movement of the positioning unit along the track assembly and table. When the proper position of the track assembly is reached, the plunger handle is simply released and the track assembly is automatically locked in place.

With the track assembly positioned at the proper angle, the piece of work to be cut is moved along the work guide 94 until the desired line of cut is aligned with the saw blade. The saw is then turned on and drawn along the track assembly across the work piece to effect the correctly angled cut. Although a saw blade guide is normally provided with the type of portable saw for which the present unit has been designed, the guard should be removed or locked in a raised position during operation of the saw with the miter guide. With the guard removed, the saw may be operated either in the conventional forward cutting stroke away from the operator or in the reverse direction toward the operator. However, it has been found that a cleaner, more accurate cut can be effected by pulling the saw toward the operator. This improved result is probably due to the direction of rotation of the saw blade which conventionally is counter-clockwise as viewed from the blade side of the saw as in FIG. 2. When the saw is drawn toward the operator, the leading saw teeth would be passing downwardly toward the table surface which provides a firm support for the material to be cut, while if operated in the normal direction away from the operator, the leading teeth would tend to lift the work from the table.

For extreme cutting angles, the track assembly must be pivoted to a position such as that shown at 144 in FIG. 1 wherein the positioning unit is shown adjacent a side edge 146 of the table rather than the front edge 98 thereof. In the present table, to facilitate such angled positioning of the track assembly, the table front corners are rounded on a radius passing through the track assembly pivot point as shown at 148 in FIG. 1. This arrangement eliminates the unduly long track assembly otherwise needed to permit engagement of the positioning assembly with the table corners.

Arcuate slots 150 must be cut in the back edge 42 of the table to permit the support blocks 78 and 80 to swing inwardly of the table edge when the pivot point of the track assembly is located inwardly of the table edge at the pivot hole 62. The back table edge is further cut away along the arcuate edge 152 between the slots 150 as shown most clearly in FIG. 3 to accommodate the support blocks when the pivot hole 64 is selected.

From the foregoing it can be understood that the present invention provides an improved miter guide for a portable power saw which is adapted for use with saws of different types, and which may be quickly and accurately adjusted to the desired miter setting. By varying the pivot point of the track assembly to the alternate position beneath the work guide, the damage to the work guide resulting from a large number of angle settings is minimized. The miter guide may be quickly removed from a table for storage, transfer to a new location, or safekeeping simply by removing the screws attaching the brackets 44 to the table top. By fabricating the guide from aluminum or other light materials, the unit can easily be transported along with the saw to successive construction sites.

Manifestly, changes in details of construction may be affected by those skilled in the art without departing from the spirit and scope of the invention as set forth in the appended claims.

I claim:

1. A miter guide for portable power saws comprising a table, a track assembly disposed in spaced parallel relation above said table, said track assembly being adapted to receive a portable power saw for guiding said saw across said table, a pivot assembly on said table supporting one end of said track assembly and permitting a pivoting thereof to the desired angular position with respect to said table, said pivot assembly including means permitting adjustment of the pivot point of said track assembly with respect to said table and said track assembly, and positioning means slidably mounted on said track assembly spaced from said pivot assembly for releasably securing said track assembly in the desired angular position on said table, said positioning means comprising a spring-loaded plunger having means thereon adapted to engage the underside of said table.

2. A miter guide as claimed in claim 1 wherein said positioning assembly comprises a spring housing slidably mounted on said track assembly, said plunger extending substantially vertically through said spring housing, a locking arm extending transversely from the lower end of said plunger and adapted to engage the underside of the table edge, and spring means in said spring housing connected to said plunger adapted to bias said locking arm against the underside of said table edge to secure the track assembly in position, said plunger being depressible against the force of said spring means to release said locking arm from engagement with said table edge thereby permitting repositioning of said track assembly.

3. The invention as claimed in claim 2 including a spacing element connected to said spring housing and adapted for sliding movement beneath said track assembly to space said track assembly above said table in conjunction with said pivot assembly.

4. The miter guide as claimed in claim 2 including a first handle on the upper end of said plunger, and a second handle fixedly mounted on said spring housing spaced below said first handle on said plunger, said handles being adapted to permit one-handed operation of said positioning assembly.

5. The invention as claimed in claim 2 including a pin on said plunger, and slot means on said housing cooperatively disposed with respect to said pin for preventing rotation of said plunger and thereby maintaining the disposition of said locking arm beneath the table edge.

6. The invention as claimed in claim 5 including means permitting selective disengagement of said pin and slot means to free the locking arm from engagement with the table edge.

7. The miter guide as claimed in claim 1 including a work guide strip extending along said table adjacent said pivot assembly, one edge of said guide strip serving to position work to be sawed on said table, said pivot assembly being adapted to permit placement of the track assembly pivot point beneath said edge of said work guide strip in alignment with the saw blade of the power saw on said track assembly.

8. The invention as claimed in claim 1, said pivot assembly comprising a pivot support plate mounted below an edge of said table, a pivot plate pivotally supported on said pivot support plate, means permitting pivoting of said pivot plate on said pivot support plate at a plurality of points on said pivot plate and on said pivot support plate, and support means on said pivot plate connecting said pivot plate with said track assembly.

9. The miter guide as claimed in claim 8 including a plurality of pivot holes on said pivot support plate, a plurality of pivot slots in said pivot plate corresponding with said pivot holes on said pivot support plate, a pivot adjustment plate adapted for selective mounting on said pivot plate and having an arm thereof adapted to extend over one of said pivot slots, a bore in said pivot adjustment plate arm adapted to receive a pivot screw passing therethrough and through one said pivot slots into one of said pivot holes, said arrangement of pivot holes and pivot slots in conjunction with said pivot adjustment plate permitting selective longitudinal and transverse adjustment of the pivot point with respect to said track assembly.

10. The invention as claimed in claim 9 wherein said table includes a work guide strip extending along the edge thereof adjacent said pivot assembly, one edge of said guide strip serving to position work to be sawed on said table, said pivot assembly being adapted to permit location of the track assembly pivot point beneath said edge of said work guide strip in alignment with the cutting blade of the power saw carried by the track assembly.

11. A miter guide for portable power saws comprising a track assembly adopted for pivoted mounting on a saw table, said track assembly being adopted to receive a portable power saw for guiding said saw across the table, and a positioning assembly on said track assembly for releasably securing the track assembly in the desired position on the table, said positioning means comprising a housing slidably mounted an said track assembly, a plunger extending through said housing, a locking arm extending transversely from the lower end of said plunger and adapted to engage the underside of the saw table edge, and spring means on said housing connected to said plunger adapted to bias said locking arm against the underside of said table edge to secure the track assembly in position, said plunger being depressible against the force of said spring means to release said locking arm from engagement with said table edge thereby permitting repositioning of said track assembly.

References Cited

UNITED STATES PATENTS

| 2,735,456 | 2/1956 | Grier et al. | 143—6 |
| 2,770,265 | 11/1956 | Pollock | 143—6 |
| 2,803,271 | 8/1957 | Shaw | 143—6 |

DONALD R. SCHRAN, *Primary Examiner.*